United States Patent [19]

Cohen

[11] Patent Number: 4,564,451
[45] Date of Patent: Jan. 14, 1986

[54] APPARATUS FOR CLEANING A SWIMMING POOL STRAINER

[75] Inventor: Joseph D. Cohen, Frisco, Tex.

[73] Assignee: Performance Pool Products, Ltd., Frisco, Tex.

[21] Appl. No.: 477,378

[22] Filed: Mar. 21, 1983

[51] Int. Cl.$^4$ .................. B01D 35/00; B01D 35/02
[52] U.S. Cl. ........................... 210/411; 210/169; 210/416.2; 137/625.46
[58] Field of Search .............. 210/169, 416.2, 416.4, 210/776, 108, 425, 426, 427, 456, 791, 411; 137/625.46

[56] References Cited

U.S. PATENT DOCUMENTS

| | | | |
|---|---|---|---|
| Re. 25,865 | 9/1965 | Richards | 210/98 |
| 1,216,547 | 2/1917 | Collin | 210/426 |
| 1,270,042 | 6/1918 | Moisant | 210/315 |
| 1,843,242 | 2/1932 | Rafton | 210/409 |
| 3,061,100 | 10/1962 | Fehlmann | 210/108 |
| 3,081,878 | 3/1963 | McCarty | 210/411 |
| 3,195,726 | 7/1965 | Saurenman et al. | 210/169 |
| 3,200,553 | 11/1965 | Growall et al. | 210/169 |
| 3,363,764 | 1/1968 | Whitaker | 210/138 |
| 3,365,064 | 1/1968 | Horan | 210/169 |
| 3,420,376 | 1/1969 | Smith | 210/169 |
| 3,581,895 | 6/1971 | Howard | 210/108 |
| 3,801,992 | 4/1974 | Sable | 210/169 |
| 4,115,276 | 9/1978 | Kelly | 137/625.46 |
| 4,153,552 | 5/1979 | Muther | 210/791 |
| 4,194,975 | 3/1980 | Baker | 210/108 |
| 4,352,739 | 10/1982 | Oliver, Jr. et al. | 210/108 |

FOREIGN PATENT DOCUMENTS 2009978 9/1971 Fed. Rep. of Germany .

OTHER PUBLICATIONS

Multi-O-Matic Pool Filter System, Brochure of Aladdin Swimming Pool Co., Nashville, Tenn.
Lo Loss Valve Products, Brochure of Mark Urban, Tustin, Ca.

Primary Examiner—Richard V. Fisher
Assistant Examiner—Sharon T. Cohen
Attorney, Agent, or Firm—Hubbard, Thurman, Turner & Tucker

[57] ABSTRACT

An apparatus for circulating water in a swimming pool including a strainer that is connected to a swimming pool unfiltered intake with a pump connected to the strainer for pumping water from the strainer to a filter. The filter in turn is connected to a swimming pool filtered return for depositing the filtered water into the swimming pool. The invention includes a valve connected to the pump, strainer and filter for temporarily altering the flow of water from the swimming pool drain to the pump and back through the strainer in a direction that is opposite to the flow of water from the swimming pool drain to a waste drain. A method for cleaning the residue collected by a strainer in a swimming pool water circulation system is also included that also includes altering the flow of water from the swimming pool intake to a pump, in order that the pump may pump water in a direction opposite to the normal flow of water through a strainer to remove particles contained in the strainer. The altered flow of water containing the particles from the strainer is then directed to a waste drain.

12 Claims, 6 Drawing Figures

APPARATUS FOR CLEANING A SWIMMING POOL STRAINER

BACKGROUND OF THE INVENTION

1. Field of the Invention:

This invention relates to swimming pool water filtration systems and specifically to swimming pool water circulation systems including a strainer.

2. Description of the Prior Art:

Swimming pool water circulation systems are provided to not only heat the water in a swimming pool but also to remove debris from the swimming pool. Most swimming pool water circulation systems include a strainer located between the pool recirculation system unfiltered intake and the pump. The strainer serves the purpose of protecting the pump from any large particles that may enter the system from the pool water circulation system unfiltered intake. The prior art method of cleaning strainers consist of removing the strainer from the system and physically removing the debris from the strainer. This technique has presented problems that result in the malfunction of the pool circulation system because of the loss of pump prime, air in the system, debris from the strainer entering the pump, or an imperfect seal when replacing the strainer.

The object of the present invention is to provide a system to alter the flow of water such that the debris in the strainer may be removed without having to physically remove the strainer from the system.

SUMMARY OF THE INVENTION

In accordance with the present invention an apparatus for circulating water in a swimming pool is disclosed that includes a strainer connected to a swimming pool unfiltered intake for retaining particles from a flow of water from the swimming pool drain. A pump is connected to the strainer for pumping water from the strainer to a filter. The filter is positioned for removing sediment and finer particles from water received from the pump. A pool filtered return is connected to the filter for depositing water from the filter into the swimming pool. The invention further includes at least one valve for temporarily altering the flow of water from the swimming pool drain to the pump and through the strainer to a waste drain in a direction opposite to the usual flow of water from the swimming pool drain.

In another embodiment of the present invention a method for cleaning the residue collected by a strainer in a swimming pool water circulation system is provided that includes the steps of first altering the flow of water from a swimming pool unfiltered intake that would normally flow to a strainer to instead flow to a pump. The second step is altering the flow of the water from the pump from normally going to a filter to instead going to the strainer in a direction opposite to the normal flow of water through that strainer. The third step is removing particles collected in the strainer by flushing the particles with the flow of water from the pump and directing this flow of water with the particles into the strainer intake. The fourth step is altering the flow of water from the strainer intake to flush the particles into a waste receptacle.

In one embodiment of the method for cleaning the residue collected by a strainer in a swimming pool circulation system, the second step further includes the blocking of the water flow from the filter to the pump.

In a still further embodiment of the invention an apparatus for circulating water in a swimming pool is provided that includes a strainer connected to the swimming pool drain for retaining particles from the flow of water from the swimming pool unfiltered intake and a pump connected to the strainer for pumping water through the strainer to a filter that is positioned to remove sediment from the water received from the pump. A swimming pool filtered return is connected to the filter for depositing water from the filter into the swimming pool. A set of valves for temporarily altering the flow of water from the swimming pool to the pump and through the strainer to a waste receptacle in a direction opposite to the flow of water from the swimming pool is also provided. This set of valves includes a first valve connected between the swimming pool drain and the connection between the pump and the filter. This first valve permits the flow of water from the swimming pool drain to the pump but restricts water from reaching the swimming pool drain from the flow of water between the pump and the filter.

In an additional embodiment of the apparatus for circulating water in a swimming pool, the set of valves includes a second valve located between the pump and the filter for providing the flow of water from the pump to the filter but prohibiting the flow of water from the filter to the pump.

In an even further embodiment of the invention the set of valves includes a third valve that in a first configuration connects the strainer to the pump and the pump to the filter and in a second configuration connects the swimming pool drain to the pump and the pump to the strainer to provide the flow of water in the opposite direction for flushing particles from the strainer.

In a still further embodiment of the present invention an apparatus for circulating water in a swimming pool is provided that includes a strainer connected to the swimming pool unfiltered intake for retaining particles from a flow of water from the swimming pool unfiltered intake to a pump connected to the strainer. The pump pumps water from the swimming pool unfiltered intake through the strainer to a filter that is positioned to remove sediment from the water. A swimming pool filtered return is connected to the filter for depositing the water back into the swimming pool. This configuration includes a set of valves for temporarily altering the flow of water from the swimming pool drain to the pump and through the strainer to a waste drain in a direction opposite to the flow of water from the swimming pool drain. This set of valves includes a first valve connected to the pump, the strainer and the filter and having a first configuration for providing a flow of water from the pump to the filter and in a second configuration for providing a flow of water from the pump to the strainer in order to reverse the direction of the flow of water through the strainer to clean the strainer. A second valve is also included that is connected to the strainer, the pump and the swimming pool unfiltered intake and having a first configuration connecting the strainer to the pump and a second configuration connecting the swimming pool unfiltered intake to the pump. A third valve is included between the swimming pool unfiltered intake, the waste drain and the strainer having a first configuration for providing a flow of water from the swimming pool unfiltered intake to the strainer and a second configuration for providing a flow of water from the strainer to the waste drain.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
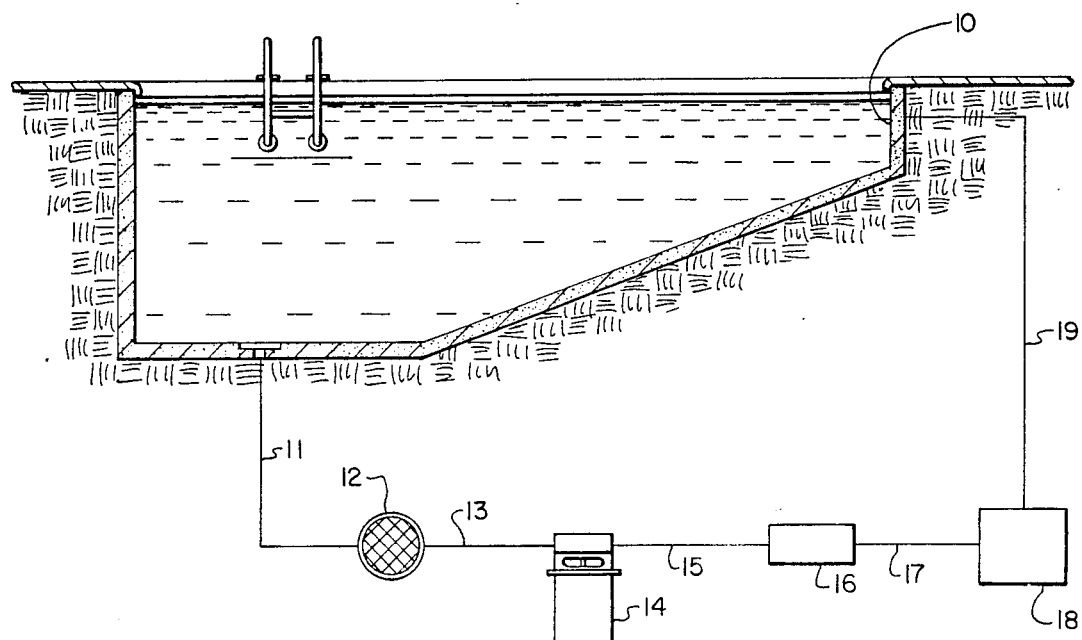
FIG. 1 is a schematic representation of a swimming pool water circulation system in the prior art.

Most modern swimming pool structures include a water circulation system. The water circulation system not only removes particles and debris from the water but may also heat the water and provide a means to introduce certain chemicals into the water. FIG. 1 illustrates a swimming pool circulation system as found in the prior art. The swimming pool 10 includes a drain pipe 11 that removes water from the swimming pool through an unfiltered intake. This water from the swimming pool unfiltered intake passes through a strainer 12 that removes large particles and protects the circulation pump 14. The pump 14 pumps water from the strainer 12 through pipe 13 to filter 16 through pipe 15 as shown. Filter 16 removes sediment and other particles not removed by the strainer 12. The water from the filter 16 passes through a pipe 17 to a heater element 18. The heater 18 may be a solar collector or a conventional combustion type heater. The heated water from the heater 18 passes back to the pool 10 through pipe 11 that is connected to the swimming pool filtered return. The water circulation system illustrated in FIG. 1 removes water from the bottom of the swimming pool 10 and strains, filters and heats the water and deposits the water back into the swimming pool 10 as shown. In this system both the filter 16 and the strainer 12 must be periodically cleaned to remove debris collected by each.

Figure 2A:
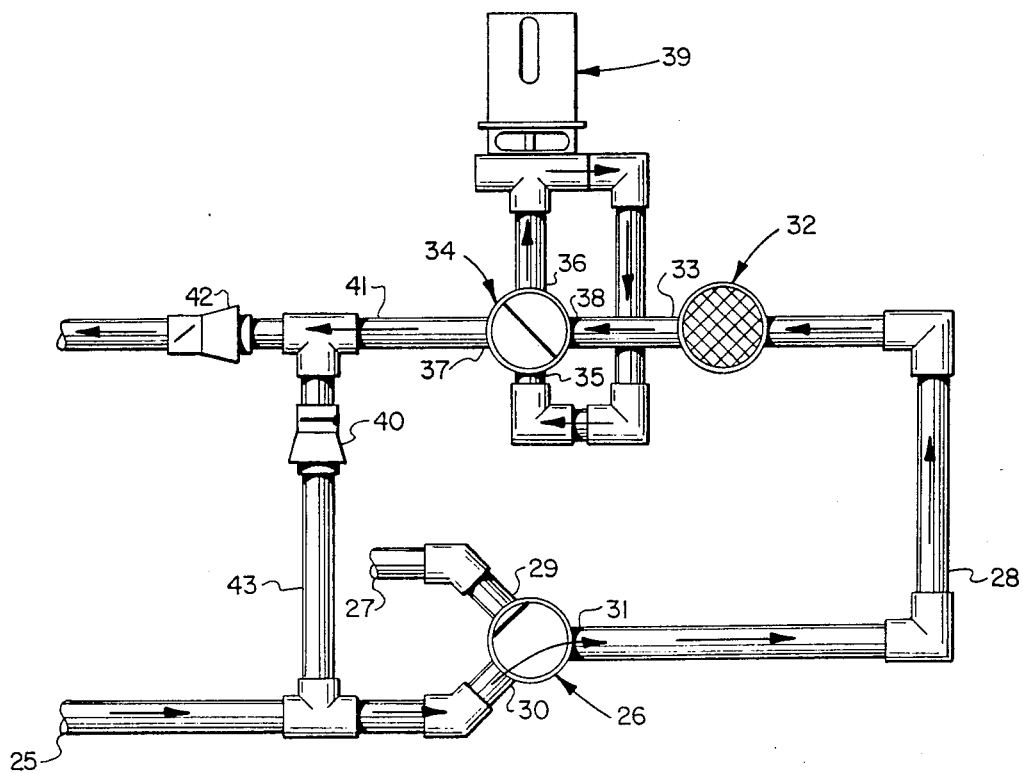
FIG. 2A is a pictorial representation of an embodiment of the invention including two multi-port valves and two check valves illustrating a first valve configuration.
Figure 2B:
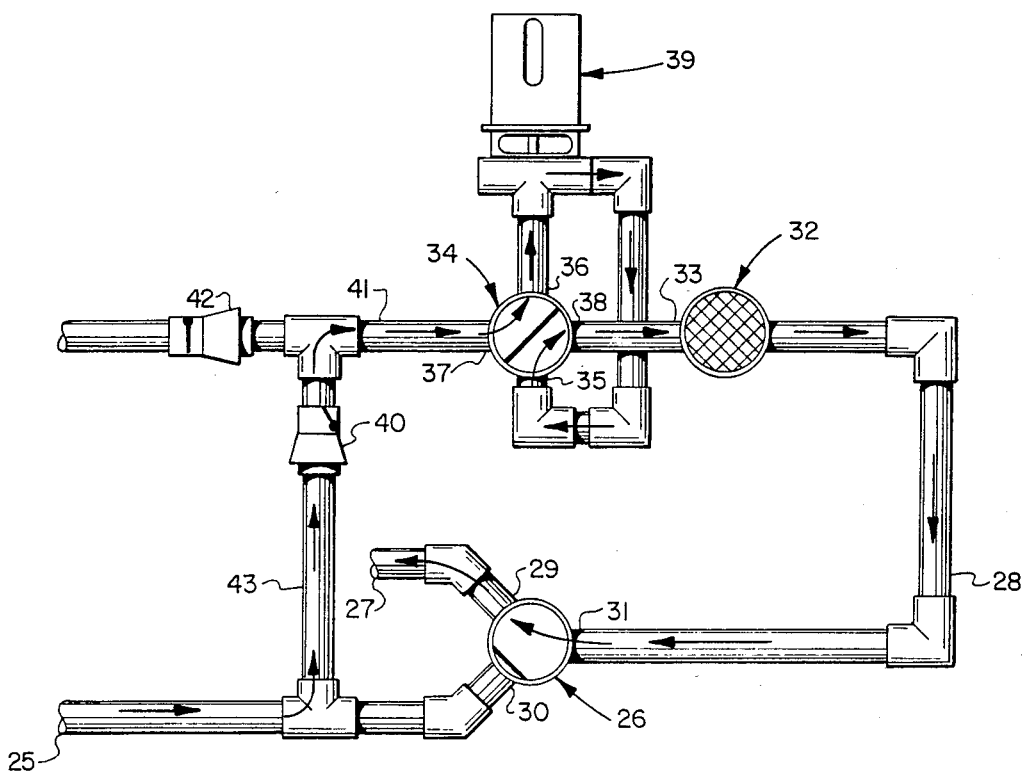
FIG. 2B is a pictorial representation of an embodiment of the invention including two multi-port valves and two check valves illustrating a second valve configuration.

The present invention addresses the problem of the removal of particles and debris from the strainer 12 in FIG. 1. One of the preferred embodiments of this invention is illustrated in FIG. 2. Pipe 25 represents the pipe from the swimming pool unfiltered intake corresponding to pipe 11 in FIG. 1. Pipe 25 is connected to a check valve 40 and a three port valve 26. One of the ports of the three port valve 26 is connected to a pipe 27 that is in turn connected to a waste drain not shown. The waste drain simply is a drain for water that is flushed through the system and which includes waste particles and other debris. The third port 31 of valve 26 is connected to pipe 28 which is in turn connected to strainer 32. Strainer 32 is also connected to the four port valve 34. The four port 34 is connected to this strainer by pipe 33 leading into port 38. The four port valve 34 is also connected to the pump 39 through port 36 and also through port 35. Port 37 is connected to pipe 41 which is in turn connected to pipe 43 and check valve 42. The water flowing from the check valve 42 travels to the swimming pool filter (not shown).

The portion of the water circulation system shown in FIG. 2 operates in two configurations. The first configuration is the normal water flow configuration that provides water from the swimming pool unfiltered intake via pipe 25 to the filter via pipe 41. The second configuration is the configuration to clean waste material collected in the strainer 32.

In the first configuration water from the swimming pool unfiltered intake 25 flows to port 30 of the three port valve 26. The check valve 40 prevents water from the pump from flowing back to the pool unfiltered intake 25 through pipe 43. The three port valve 26 is in a configuration where port 29 is closed allowing the flow of water from port 30 to port 31 and to pipe 28. The flow of water then passes through strainer 32 to pipe 33. The water from pipe 33 enters the four port valve 34 via port 38. The four port valve 34 is in a configuration that connects ports 38 and 36 and ports 35 to 37. Therefore the water flowing into port 38 flows out of port 36 to the pump 39 and then back into the four port valve 34 through port 35 and out port 37 into pipe 41 through check valve 42 into the filter. This first configuration provides the normal flow of water to the filter while protecting pump 39 by strainer 32. In this configuration waste material will be collected in strainer 32 and must be removed.

The second configuration directs water in the opposite direction through the strainer to flush out waste material in the strainer into the waste drain. In the second configuration the three port valve 26 is configured such that port 30 is closed therefore water coming from the swimming pool intake into pipe 25 is directed to pipe 43 through check valve 40 into pipe 41. The four port valve 34 is configured connecting the input to pump 39 via port 37 to port 36. Therefore port 37 connected to pipe 41 pulls water in pipe 41 in the opposite direction to the normal flow in the first configuration. Check valve 42 prevents water from returning from the filter back into pipe 41. Therefore the water passing through port 37 of the four port valve 34 is the water from the swimming pool unfiltered intake connected to pipe 25. This water passes to the pump 39 from port 36 and back to the four port valve 34 inlet port 35 which is configured to be connected to port 38. The water from the pump 39 leaves the four port valve 34 via port 38 and pipe 33 to back flush the strainer 32 in the reverse direction to the normal flow of water in the first configuration. This back flushing through the strainer 32 removes waste debris contained in the strainer 32. The waste debris and water travel through pipe 28 into the three port valve 26 through port 31 that is now connected to port 29. The water and waste debris are then deposited to a waste drain via pipe 27.

The embodiment of this invention shown in FIG. 2 then provides a means to periodically clean the contents of strainer 32 by altering the direction of the water from the swimming pool intake in the reverse direction through the strainer into a waste drain.

Figure 3A:
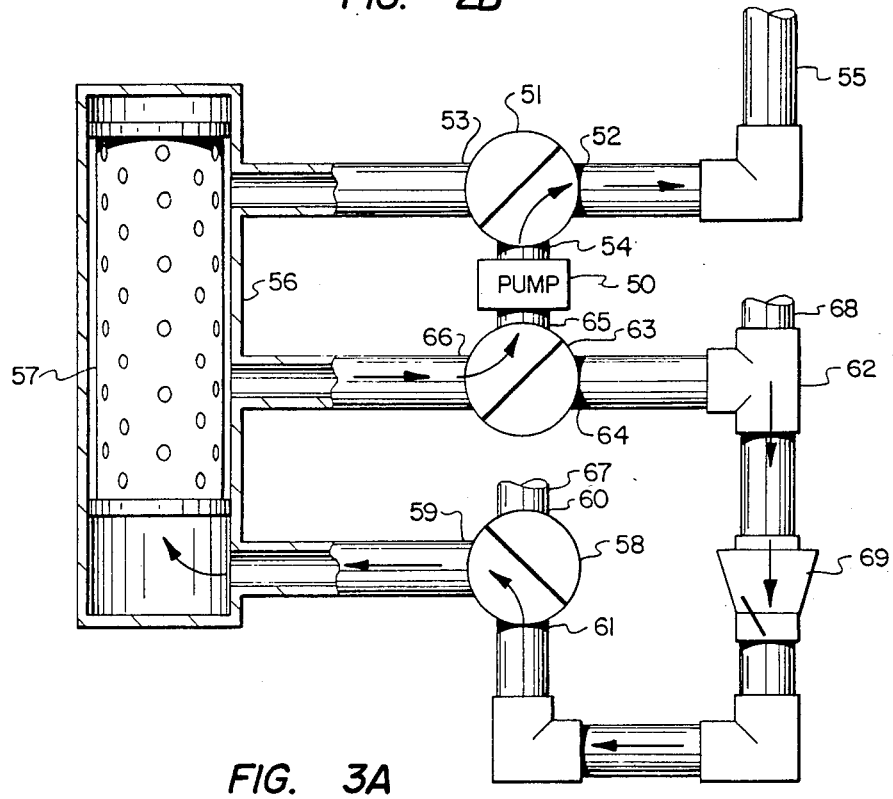
FIG. 3A is a pictorial view of another embodiment of the invention including three multi-port valves and one check valve illustrating a first valve configuration.
Figure 3B:
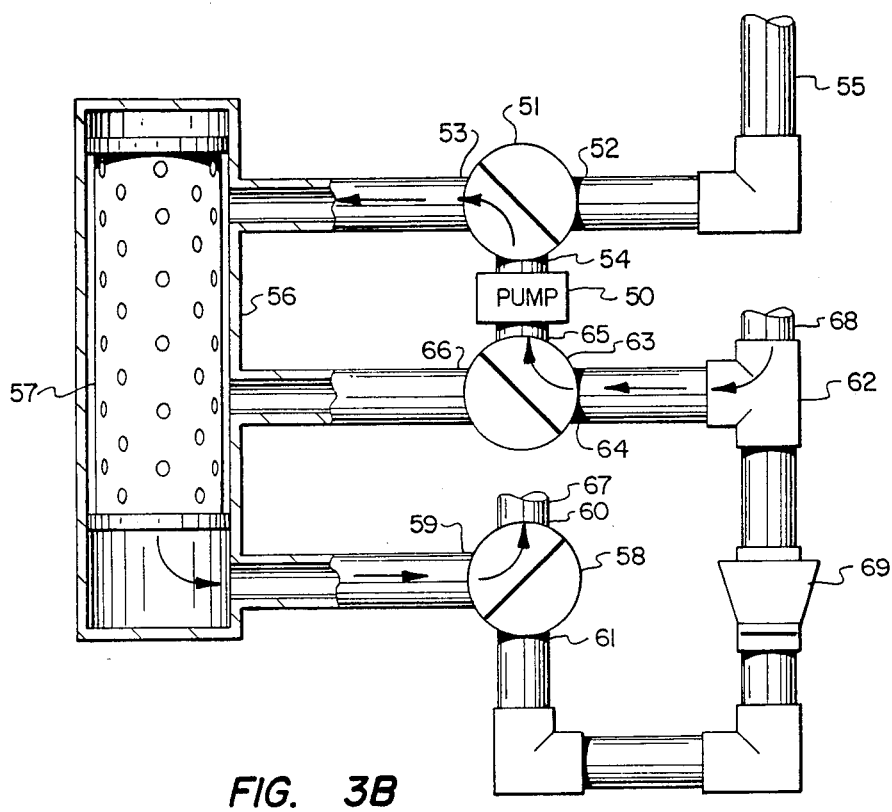
FIG. 3B is a pictorial view of the other embodiment of this invention including the three multi-port valves and the one check valve illustrating a second valve configuration.

A second embodiment of this invention is illustrated in FIG. 3. Again the structure in FIG. 3 is a pictorial illustration of the plumbing including valves and the pump between the swimming pool unfiltered intake and the filter. In this configuration the swimming pool unfiltered intake is connected to pipe 68 which is in turn connected to a Tee 62, Tee 62 is connected to a three port valve 58 at port 61 and through check valve 69. The third side of Tee 62 is connected to a second three port valve 63 at port 64. Port 60 of the three port valve 58 is connected to pipe 67 which is in turn connected to a waste drain not shown. Port 59 of the three port valve is connected to strainer 57. Strainer 57 is contained in a casing 56. Casing 56 connects port 66 of the three port valve 63 to port 53 of the three port valve 51. Port 65 of the three port valve 63 is connected to the inlet of pump 50, the output of pump 50 is connected to port 54 of the three port valve 51. Port 52 of the three port valve is connected to pipe 55 which provides the water flow to the filter.

In the first configuration port 64 of three port valve 63 is closed. Port 60 of the three port valve 58 is closed and port 53 of the three port valve 51 is closed. Water from the pool unfiltered intake connected to pipe 68 flows through Tee 62 and the check valve 69 and into port 61 of the three port valve 58 and out of port 59. The water from port 59 flows through the strainer 57 to remove waste particles from the water and prevent these particles from reaching the inlet of the pump 50. The strained water from the strainer 57 flows from casing 56 into port 66 of the three port valve 63. Water then flows through port 65 to the inlet of the pump 50. The output of pump 50 flows into the three port valve 51 through port 54. This pumped water flows out of the three port valve 51 through port 52 into pipe 55 to the swimming pool filter.

In the second configuration port 61 of the three port valve 58 is closed. Port 66 of the three port valve 63 is closed and port 52 of the three port valve 51 is closed. The water from the swimming pool inlet flows through pipe 68 to Tee 62 and then through port 64 of the three port valve 63 to the pump 50 inlet through port 65. The water is then pumped through the three port valve 51 from port 54 to port 53 and through casing 56 back through strainer 57 in the opposite direction of the flow of water in the first configuration in order to flush out the waste debris contained in strainer 57. The water and waste material from strainer 57 will flow through the three port valve 58 from port 59 to port 60 and through pipe 67 to a waste drain. The check valve 69 is optional and is positioned to prevent debris from the strainer 57 from back flushing into the pump 50 when valves 63 and 58 are in midway position when the valves 50 positions are being changed. In this manner waste debris is flushed from the strainer 57.

The advantage of this invention as shown in the preferred embodiments is that it provides for the cleaning of the strainer 57 without having to remove the strainer from the swimming pool water recirculation system.

Figure 4:
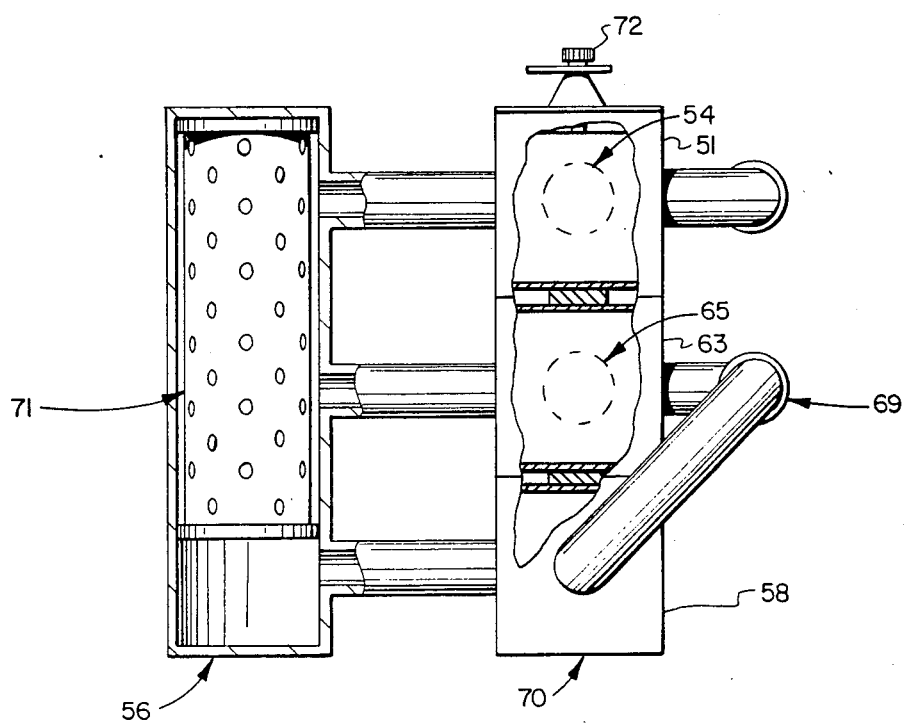
FIG. 4 is a pictorial view of an embodiment of the invention including a single valve structure containing three multi-port valves connected to a check valve and strainer including a cutaway view of the valve structure.

FIG. 4 illustrates the second embodiment of this invention including three stacked three port valves 70 connected by the same valve shaft 72 such that when changing from the first configuration, i.e. normal flow through the strainer 71, to the second configuration, i.e. the cleaning of strainer 71, the valves 51, 63 and 58 (which correspond to the valves in FIG. 3) are all altered at the same time by the same valve shaft rotation. In FIG. 4, ports 54 and 65 are connected to a pump not shown. Check valve 69 is provided as explained in FIG. 3. The bottom of the strainer casing 56 serves to collect waste material to be removed to the waste drain when the flow of water is altered.

In a still further embodiment the valves of both of the previously two illustrated embodiments may be connected to electronically controlled actuators to control the position of the valves. These actuators can in turn be connected to an electrical timing clock to actuate the valves at periodic times. In this manner the strainer in the swimming pool circulation system may be periodically backflushed to clean waste material from the strainer.

In addition the actuators may be connected to a water flow monitoring device. The water flow monitoring device would be located at the outlet of the strainer casing. When the water flow monitoring device indicated a decreased flow rate below a set level indicating a clogged strainer, the actuator would change the valve configuration to clean the strainer for a specific period.

Although preferred embodiments of the invention have been described in detail, it should be understood that various changes, alterations and substitutions may be made therein without departing from the spirit and scope of the invention as defined by the appended claims.

What is claimed is:

1. An apparatus for circulating water in a swimming pool comprising:
   a swimming pool intake;
   a strainer means for retaining particles from a flow of water and including a strainer inlet and a strainer outlet;
   a pump including a suction inlet and a discharge outlet;
   a filter for removing sediment from water;
   a swimming pool return connected to the filter; and
   valve means for providing a first valve configuration having the strainer inlet connecting to the swimming pool intake, the strainer outlet connecting to the pump suction inlet and the pump discharge outlet connecting to the filter and for providing a second valve configuration having the pump suction inlet connecting to the swimming pool intake, the pump discharge outlet connecting to the strainer outlet and the strainer inlet connecting to a waste receptacle.

2. An apparatus for circulating water in a swimming pool according to claim 1 wherein said valve means includes a first valve connected between the swimming pool intake and a connection between the pump and filter, said first valve for permitting a flow of water from the swimming pool intake to the pump inlet in said second valve configuration but prohibiting a flow of water from reaching the swimming pool intake from the pump or the filter in either said first or second valve configuration.

3. An apparatus for circulating water in a swimming pool according to claim 2 wherein said valve means includes a second valve located between the pump and the filter for permitting a flow of water from the pump to the filter in said first valve configuration but prohibiting a flow of water from the filter to the pump in either said first or second valve configuration.

4. An apparatus for circulating water in a swimming pool according to claim 3 wherein said valve means includes a third valve that in the first valve configuration connects the strainer outlet to the pump suction inlet and the pump discharge outlet to the filter and in the second valve configuration connects the swimming pool intake to the pump suction inlet and the pump discharge outlet to the strainer outlet to provide a flow of water to the strainer in an opposite direction to the flow of water through the strainer in the first configuration for flushing the strainer.

5. An apparatus for circulating water in a swimming pool according to claim 4 wherein said valve means includes a fourth valve that in the first valve configuration connects the swimming pool inlet to the strainer inlet and in the second valve configuration connects the strainer inlet to the waste receptacle.

6. An apparatus for circulating water in a swimming pool according to claim 1 wherein said valve means includes a first valve connecting the pump, the strainer and the filter and in the first valve configuration for permitting a flow of water from the pump discharge outlet to the filter and in the second valve configuration for permitting a flow of water from the pump discharge outlet to the strainer inlet.

7. An apparatus for circulating water in a swimming pool according to claim 6 wherein said valve means includes a second valve connecting the strainer, the pump and the swimming pool intake and in the first valve configuration connecting the strainer outlet to the pump suction inlet and in the second valve configuration connecting the swimming pool intake to the pump suction inlet.

8. An apparatus for circulating water in a swimming pool according to claim 7 wherein said valve means further includes a third valve connected between the swimming pool intake, the waste receptacle and the strainer and in the first valve configuration connecting the swimming pool intake to the strainer inlet and in the second valve configuration connecting the strainer inlet to the waste receptacle.

9. An apparatus for circulating water in a swimming pool comprising:
a strainer for retaining particles from a flow of water from a swimming pool intake;
a pump;
a filter;
a swimming pool return connected to the filter for depositing water from the filter into the swimming pool;
a first valve connecting the pump, the strainer and the filter and having a first configuration connecting the pump to the filter and a second configuration for connecting the pump to the strainer;
a second valve connecting the strainer, the pump and the swimming pool intake and having a first configuration connecting the strainer to the pump and a second configuration connecting the swimming pool intake to the pump;
a third valve connected between the swimming pool intake, a waste receptacle and the strainer having a first configuration connecting the swimming pool intake to the strainer and a second configuration connecting the strainer to a waste receptacle; and
a valve actuation means connected to said first, second and third valves for simultaneously changing the valve configurations.

10. An apparatus for circulating water in a swimming pool according to claim 9 wherein said first, second and third valves are configured in a vertical stack having said first, second and third valves isolated from each other except for said valve actuation means which includes a valve shaft connecting all three valves in said stack.

11. An apparatus for circulating water in a swimming pool according to claim 10 wherein said shaft is connected externally to a handle for allowing manual change of the valve configurations.

12. An apparatus for circulating water in a swimming pool comprising:
a swimming pool intake;
a strainer means for retaining particles from a flow of water;
a pump means including a suction inlet and a pressure outlet and for providing said flow of water;
a filter for removing sediment from the flow of water;
a swimming pool return connected to the filter and for depositing the flow of water into the swimming pool;
a valve means for providing:
(1) a first valve configuration having connections for the pump suction inlet to receive the flow of water from the swimming pool intake through the strainer means and having connections for the pump pressure outlet to provide the flow of water through the filter to the swimming pool return, and
(2) a second valve configuration having connections for the pump suction inlet to receive the flow of water from the swimming pool inlet and having connections for the pump pressure outlet to provide the flow of water through the strainer means to a waste receptacle, said flow of water through the strainer means from the pump pressure outlet in the second valve configuration being in an opposite direction to the flow of water through the strainer means from the pump suction inlet in the first valve configuration.

* * * * *